(12) United States Patent
Kikuchi

(10) Patent No.: US 12,314,811 B2
(45) Date of Patent: May 27, 2025

(54) COMPUTER-READABLE RECORDING MEDIUM FOR RECORDING A COLLATION SYSTEM, A COLLATION METHOD, AND A COMPUTER PROGRAM

(71) Applicant: AKAmedia Japan Inc., Tokyo (JP)

(72) Inventor: Mairu Kikuchi, Tokyo (JP)

(73) Assignee: AKAmedia Japan Inc., Tokyo (JP)

( * ) Notice: Subject to any disclaimer, the term of this patent is extended or adjusted under 35 U.S.C. 154(b) by 0 days.

(21) Appl. No.: 18/418,577

(22) Filed: Jan. 22, 2024

(65) Prior Publication Data

US 2024/0249094 A1    Jul. 25, 2024

(30) Foreign Application Priority Data

Jan. 23, 2023    (JP) .................................. 2023-008422

(51) Int. Cl.
*G06K 7/14*    (2006.01)
*G09B 5/06*    (2006.01)

(52) U.S. Cl.
CPC ......... *G06K 7/1417* (2013.01); *G06K 7/1413* (2013.01); *G09B 5/065* (2013.01)

(58) Field of Classification Search
None
See application file for complete search history.

(56) References Cited

U.S. PATENT DOCUMENTS 9,369,287 B1 * 6/2016 Sarvestani ............... G07D 7/01
2017/0352039 A1 * 12/2017 Malkawi .......... G06K 19/06187
2019/0197220 A1 * 6/2019 Anderson ................ G09B 7/00
2023/0334479 A1 * 10/2023 Nah ..................... G06Q 20/389

FOREIGN PATENT DOCUMENTS

JP        2002-351299 A       12/2002
KR         2119079 B1 *   6/2020   ....... G06K 19/06037

* cited by examiner

*Primary Examiner* — Thien M Le
*Assistant Examiner* — April A Taylor
(74) *Attorney, Agent, or Firm* — Keating & Bennett, LLP

(57) ABSTRACT

An authentication system is a verification system for verifying a certificate of completion of a distributed learning material, and includes a reading device and an authentication server. First identification information that is used for user authentication to authenticate that a first user who instructed distribution of a learning material is a registered user is stored in an educational institution server (first server) in association with unique information of the registered user. The certificate of completion includes first information that corresponds to the first identification information and second information that corresponds to the unique information. The reading device is configured to read the first information and the second information from the certificate of completion. The processing device is configured to verify the identification information obtained from the read first information, with the first identification information stored in the first server in association with the unique information obtained from the read second information.

10 Claims, 11 Drawing Sheets

| ID | NAME | PASSWORD | ADDRESS | FACE PHOTO DATA FOR AUTHENTICATION |
|---|---|---|---|---|
| 1234 | AA BB | gu549gj | XXX XXXXX XXXXXXXX | 😊 |
| 2345 | CC DD | vsus934 | ... | ... |
| 3456 | ... | ... | ... | ... |
| 4567 | ... | ... | ... | ... |
| ... | ... | ... | ... | ... |

FIG.4

COMPUTER-READABLE RECORDING MEDIUM FOR RECORDING A COLLATION SYSTEM, A COLLATION METHOD, AND A COMPUTER PROGRAM

BACKGROUND ART

The present disclosure relates to a verification system, a verification method, and a computer-readable recording medium that stores a computer program.

In recent years, a learning system for distributing a lecture that is distributed in real time or has been recorded via the Internet or the like and allowing a user to learn the same, which is a so-called e-learning, has been used widely. When learning of such a distributed learning material is completed, a certificate of completion may be issued. The certificate of completion certifies the completion of the learning by a pre-registered user, and can also be referred to as a certificate certifying that the user has watched a content including the lecture. For example, in the case of reproducing contents such as entertainment, the certificate of may be a certificate of completion showing that the contents have been watched a predetermined number of times.

For example, JP-A-2002-351299 discloses a configuration of an educational system using a network, in which a certificate of completion is transmitted to a student client device of a student who has met set completion conditions.

SUMMARY OF INVENTION

If completing the learning of a learning material, for example, a lecture, is required to obtain a qualification or license, the confirmation of the authenticity of the certificate of completion is important for the side granting the qualification or license. In other words, it is important to confirm the authenticity of the user, i.e., whether the user presenting the certificate of completion is the user who actually take the learning material. There is a desire to effectively prevent impersonation, for example, by a third party who, after a pre-registered user learns a learning material and receives a certificate of completion, rewrites the certificate of completion and presents it as if it was the third party who completed the learning. Therefore, one of the objects of the present disclosure is to provide a verification system and verification method for verifying a certificate of completion of a distributed learning material, and a computer-readable recording medium that stores a computer program.

According to one embodiment, the verification system has the following configuration. The verification system is a verification system for verifying a certificate of completion of a distributed learning material, and includes a reading device and a processing device. First identification information that is used for user authentication to authenticate that a first user who instructed distribution of a learning material is a registered user is stored in a first server in association with unique information of the registered user. The certificate of completion includes first information that corresponds to the first identification information and second information that corresponds to the unique information. The reading device is configured to read the first information and the second information from the certificate of completion. The processing device is configured to verify the identification information obtained from the read first information, with the first identification information stored in the first server in association with the unique information obtained from the read second information.

Further details are described as embodiments described later.

BRIEF DESCRIPTION OF DRAWINGS

FIG. 4 illustrates exemplary user registration data.

DESCRIPTION OF PREFERRED EMBODIMENT

[System Overview]

Figure 1:
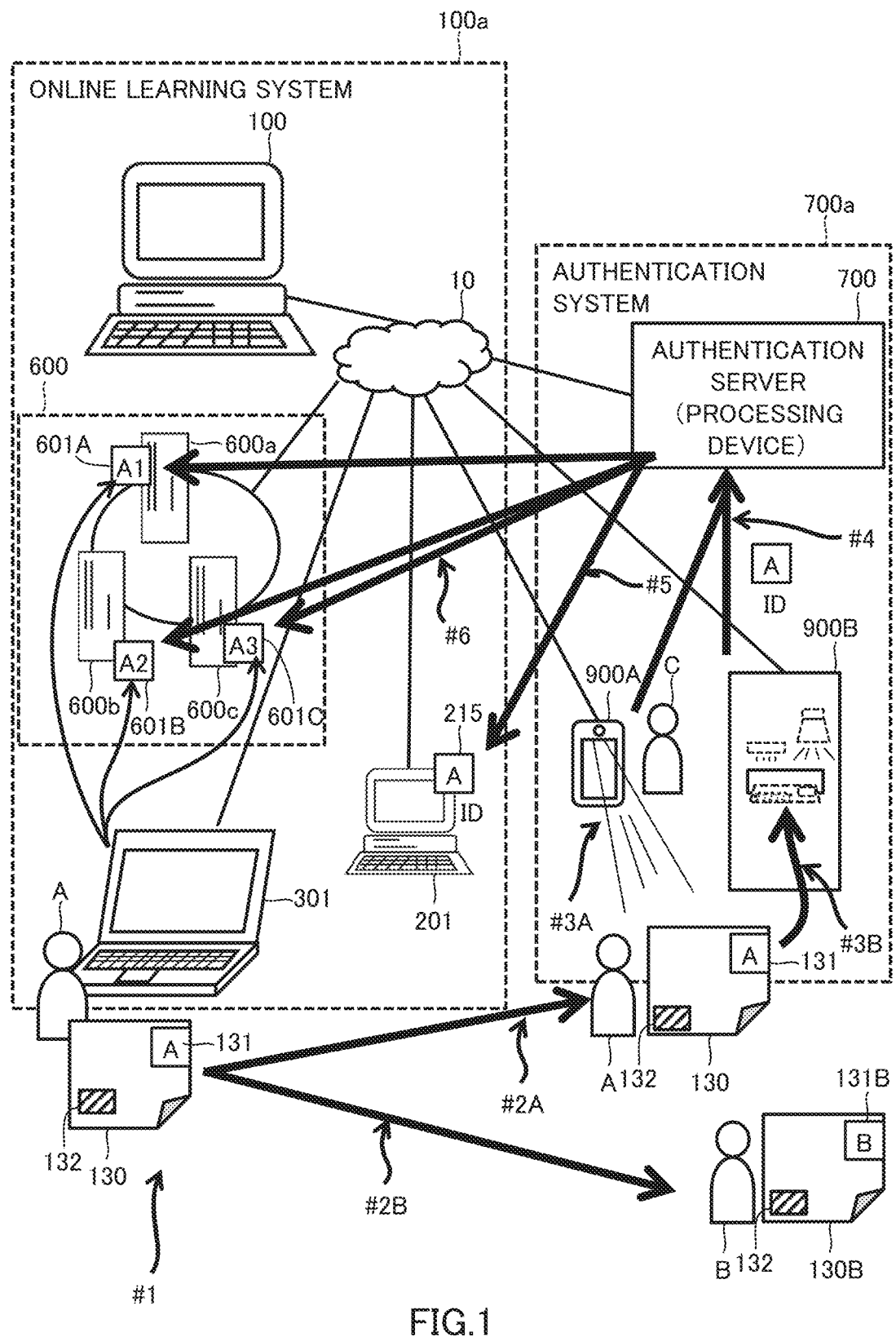
FIG. 1 is a schematic diagram of a verification system according to an embodiment.

FIG. 1 is a schematic diagram illustrating an online of a system according to the present embodiment. In the present embodiment, when a user A registered in the online learning system 100a learns a distributed learning material (content) and completes the same, a certificate of completion 130 certifying the completion is issued (#1). The user A brings the issued certificate of completion 130 to a driver's license center or the like, and submits it (#2A). The driver's license center or the like uses an authentication system 700a to authenticate that the submitted certificate of completion is the certificate of completion 130 certifying that the user A has completed the learning (#3 to #6). This makes it possible to determine if a user B, who is not the user A, obtains the certificate of completion 130 and submits a certificate of completion 130B that has been altered to look like the user B's own (#2B), which is so-called impersonation.

Specifically, the user A registers face photo data for authentication (first identification information) 215 and ID (identification) (second identification information) to an educational institution server 201 (first server) included in the online learning system 100a. The face photo data for authentication 215 and the ID are used for user authentication in the online learning system 100a when a learning material is distributed. In other words, the learning material is distributed from a distribution device 100 to a user terminal 301 of the user A only after the user authentication is successful.

The face photo data for authentication 215 and the ID are used for user authentication in the online learning system 100a using a face images (sampled data) of a student photographed with the user terminal 301 at an appropriate time during distribution of the learning material. As a result, the user A's learning is confirmed in the online learning system 100a.

Sampled data 601A, 601B, 601C, . . . corresponding to successful user authentication during learning are distributed and stored in a plurality of storage servers 600a, 600b, 600c, . . . (second servers), which are different from the educational institution server 201.

The certificate of completion 130 displays a first image 131 showing the face image of the user A, and a second image 132 showing the ID. When the user A brings the certificate of completion 130, as a first example, a staff member photographs the first image 131 and second image 132 to read the same, with a reading device 900A that the staff member carries (#3A). As a second example, the user A, bringing the certificate of completion 130, causes the certificate of completion 130 to be read by a reading device 900B exclusive for such use, installed in a driver's license center or the like (#3B).

Image data of the read first image 131 and the ID obtained from the second image 132 are passed to an authentication server 700 (#4). In the authentication server 700, the image data of the first image 131 are verified with face photo data for authentication 215 of the user A read from the educational institution server 201 using the received ID (#5). Further, in the authentication server 700, the image data of the first image 131 are verified with a plurality of sets of sampled data read from the storage servers 600a, 600b, 600c using the received ID (#6).

When the user A submits his/her own certificate of completion 130 (#2A), since the user A's ID is read from the second image 132, and the user A's face image is read from the educational institution server 201 and from any of the storage servers 600a, 600b, 600c, the face image read from the first image 131 is successfully verified. Therefore, in the authentication system 700a, it is authenticated that the certificate of completion 130A certifies that the user A has completed the learning of the learning material.

On the other hand, in such a case of so-called impersonation that a user B, who is not the user A, obtains the certificate of completion 130 and submits a certificate of completion 130B that has been altered to look like the user B's own (#2B), it is thought that the certificate of completion 130B displays a first image 131B whose face photo has been altered to be that of the user B, and the second image 132 of the user A. In this case, the user A's face photo data for authentication 215 corresponding to the user A's ID are obtained from the educational institution server 201 as well as from any of the storage servers 600a, 600b, and 600c, and the verification with the user B's face image fails.

Even if the educational institution server 201 is hacked and user A's face photo data for authentication 215 are rewritten to those of the user B, the possibility that the sampled data of all the plurality of storage servers 600a, 600b, and 600c would also be rewritten is small, and the verification with the user B's face image using sampled data fails.

[Details of System]
[Schematic Configuration of Authentication System]

An authentication system 700a includes an authentication server 700, which is an example of a processing device that can perform mutual communication via a communication network such as the Internet 10, and a reading device 900. As another example, the authentication server 700 and the reading device 900 may be integrated in one device. Incidentally, a device typified by the reading device 900A in the first example and the reading device 900B in the second example is referred to as a reading device 900. The authentication server 700 is communicable with the online learning system 100a.

[Schematic Configuration of Online Learning System]

The online learning system 100a refers to a system that distributes learning materials. The learning material here is an example of a content that is distributed to users online and provides information to the users through at least one of auditory and visual means.

The online learning system 100a issues a certificate of completion 130 when it is determined that a user A has completed the learning of a learning material. The certificate of completion 130 is an example of a certificate showing that the user A has reproduced a predetermined amount of a content.

Figure 2:
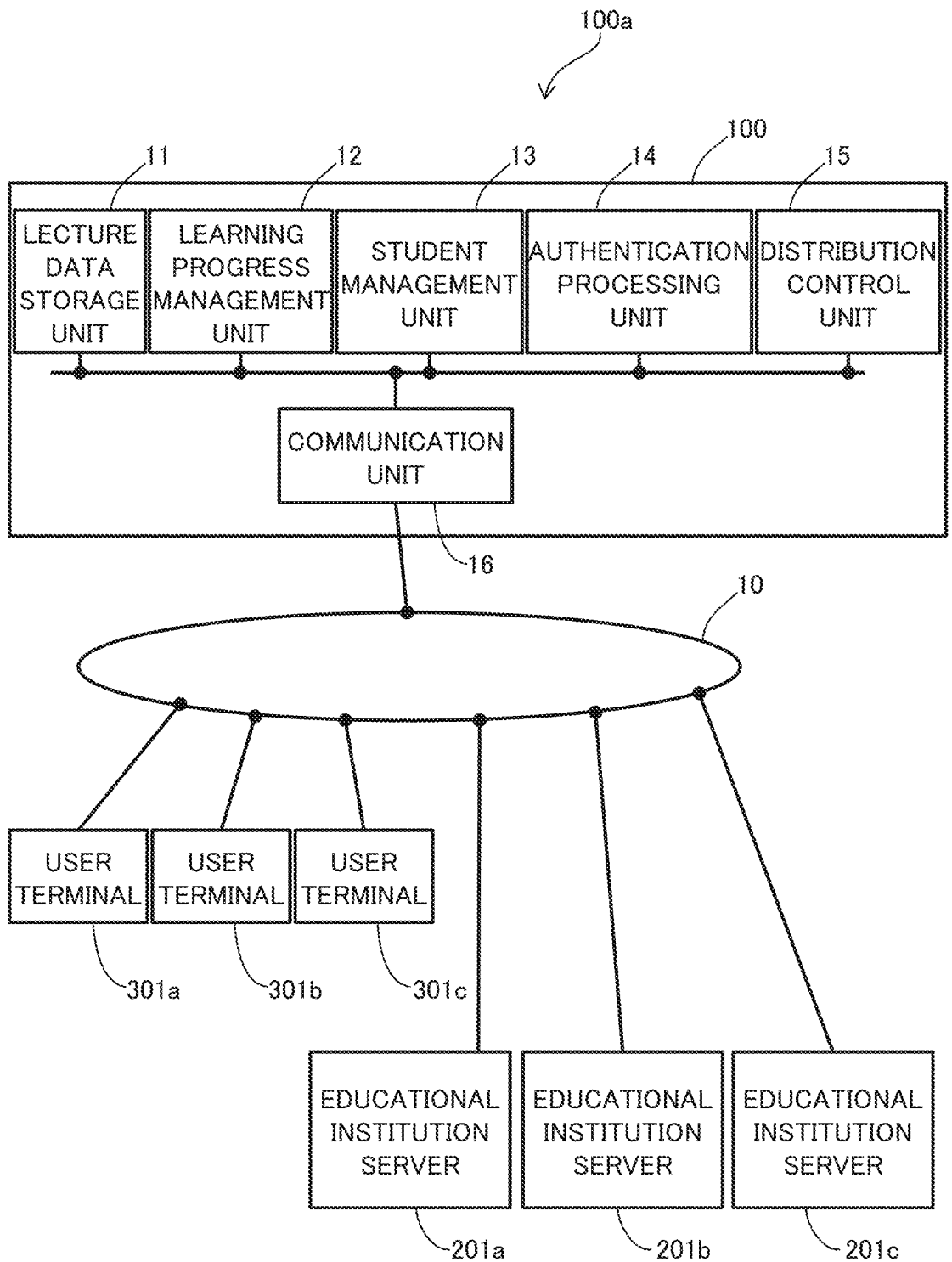
FIG. 2 is a schematic diagram illustrating a schematic configuration of an online learning system.

FIG. 2 is a schematic diagram illustrating a schematic configuration of the online learning system 100a. The online learning system 100a includes a distribution device 100 that distributes learning materials via the Internet 10. The online learning system 100a includes one or more educational institution servers 201a, 201b, 201c, . . . connected to the distribution device 100 via the Internet 10. A server typified by the educational institution servers 201a, 201b, 201c, . . . is referred to as the educational institution server 201. The online learning system 100a also includes one or more user terminals 301a, 301b, 301c, . . . connected to the distribution device 100 via the Internet 10. A user terminal typified by the user terminals 301a, 301b, 301c, . . . is referred to as the user terminal 301.

[Description of Distribution Device]

The distribution device 100 is configured by, for example, a computer including a processor and a memory, or one computer and its peripheral devices. The distribution device 100 may be realized by a plurality of computers working together. The processor is, for example, a central processing unit (CPU). The memory includes, for example, a read only memory (ROM) or a random access memory (RAM).

The memory stores a computer program to be executed by the processor (hereinafter referred to as a program). By executing programs, the processor realizes functions shown as respective parts described below. It should be noted that the processor and memory configurations are the same for the educational institution server 201 and user terminal 301, which will be described later.

The distribution device 100 includes a lecture data storage unit 11 for storing online learning materials. The distribution device 100 includes a learning progress management unit 12, a student management unit 13, a distribution control unit 15, and a completion processing unit 17. These functions are realized by the processor executing the program.

The learning progress management unit 12 stores learning history of each user in the memory. The learning history may be for each item. The learning progress management unit 12 stores, in the memory, learning history of each user in association with the user's unique information. The unique information of the user may be any information that can identify the user, and as an example, it is the same as the user's ID 211 included in user registration data 210 in the educational institution server 201, which will be described later.

The student management unit 13 manages users. User management includes login processing for a user (first user) that instructs start of learning. As an example, the login processing includes reading user registration data 210 (FIG. 4) out of a registration data storage unit 21 of the educational institution server 201, which will be described later, and performing user authentication (identity verification) using information input from the user terminal 301. The user registration data 210 may be obtained from the educational institution server 201 and stored in the memory.

Managing registered users includes issuing certificates of completion. A certificate of completion may be issued electronically and displayed on the screen of a terminal device such as a smartphone (digital certificate of completion), or it may be printed on a physical medium such as paper or a plate (analog certificate of completion). The distribution device 100 may issue the certificate of completion, or may instruct the educational institution server 201 to issue the certificate of completion.

The distribution control unit 15 controls the distribution of learning materials. Controlling the distribution includes controlling the distribution in response to an instruction such as distribution start or stop from the user terminal 301. Controlling the distribution includes permitting the distribution if the login processing in the student management unit 13 is successful, and disallowing the distribution if the login processing fails. Controlling the distribution may include determining the distribution position (reproduction start position) based on the learning history.

Preferably the distribution device 100 includes an authentication processing unit 14. The authentication processing unit 14 performs identity verification of a student and learning progress confirmation during distribution of a learning material. Identity verification and learning progress confirmation during distribution will be described later.

The distribution device 100 includes communication unit 16. The communication unit 16 is realized by a communication device such as a communication module and a function of the processor that controls the communication device. The communication unit 16 communicates with user terminals 301 and the educational institution server 201 via the Internet 10.

[Description of Educational Institution Server]

Figure 3:
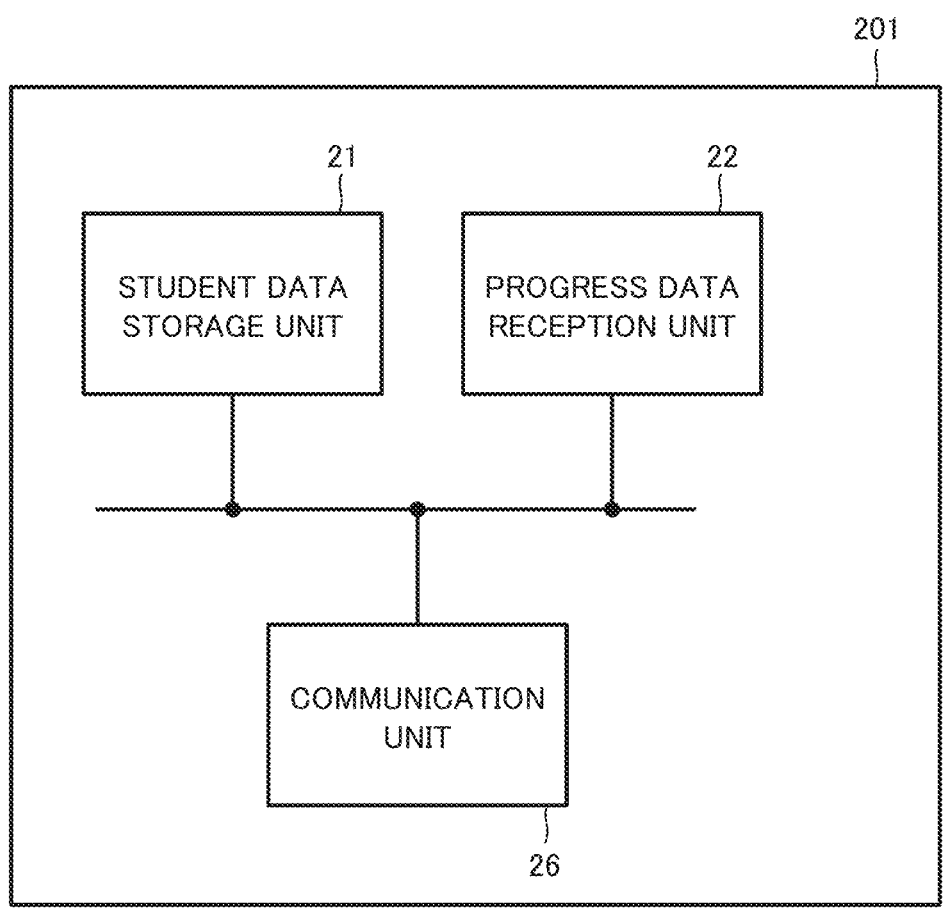
FIG. 3 is a block diagram illustrating a schematic configuration of an educational institution server.

FIG. 3 is a block diagram showing a schematic configuration of the educational institution server 201. The educational institution server 201 is configured by, for example, a computer including a processor and a memory, or one computer and its peripheral devices. The educational institution server 201 may be realized by a plurality of computers working together.

The educational institution server 201 includes a registration data storage unit 21 for storing user registration data. FIG. 4 illustrates one example of user registration data 210 stored in the registration data storage unit 21. User registration data 210 are entered from a user terminal 301 by a student or lecturer using the online learning system 100*a*, and are stored in the registration data storage unit 21.

The user registration data 210 includes, for each user, one or more pieces of information that can be used to identify the user. A user whose information is included in the user registration data 210 will also be referred to as a registered user in the following description. As an example, user registration data 210 include, for each registered user, his/her ID 211, name (for example, full name) 212, password 213, address 214, and face photo data for authentication 215. In addition to the above data 211 to 215, the user information included in the user registration data 210 may also include his/her date of birth (not shown), telephone number (not shown), e-mail address (not shown), and the like.

The face photo data for authentication 215 are an example of identification information (first identification information) of a registered user, and are identification information obtained by scanning the user. Scanning a user is, for example, photographing at least a part of the user's body. In this case, the first identification information is information (image information) obtained from the photographed image, and the image information is, for example, the photographed image itself. The at least a part of the user's body may be, for example, a face. The first identification information obtained by photographing the user's face corresponds to the face photo data for authentication 215. The photographed image may be a photographed image of a palm, a finger, or an eye, as other examples. In this case, the first identification information may be a palm print, a fingerprint, an iris, or a combination of two or more of these.

As another example, the image information may be a feature amount obtained from a photographed image (for example, a face image). The feature amount may be a two-dimensional or three-dimensional coordinate point of a specific part (for example, the center of the pupil), a distance between specific parts, a color distribution, a combination of two or more of these, or the like.

The face photo data for authentication 215 may be uploaded from the user terminal 301, or may be scanned (for example, photographed) at the educational institution and input directly to the educational institution server 201.

By using such information as the first identification information, it becomes possible to perform the login processing and verification described later with high accuracy. In addition, by using image information other than face image data, it is possible to suppress the user's personal information stored in the registration data storage unit 21, control the range of disclosure of personal information, and protect user privacy suitably.

The educational institution server 201 includes a progress data reception unit 22. The progress data reception unit 22 is a function realized by the processor executing programs. Each time a registered user completes learning an online learning material (content), the progress data reception unit 22 receives information of the same from the distribution device 100, and manages the information as progress data.

The educational institution server 201 includes a communication unit 26. The communication unit 26 is realized by a communication device such as a communication module and a function of the processor that controls the communication device. The communication unit 26 controls communication with the user terminals 301 and the distribution device 100.

[Description of User Terminal]

Figure 5:
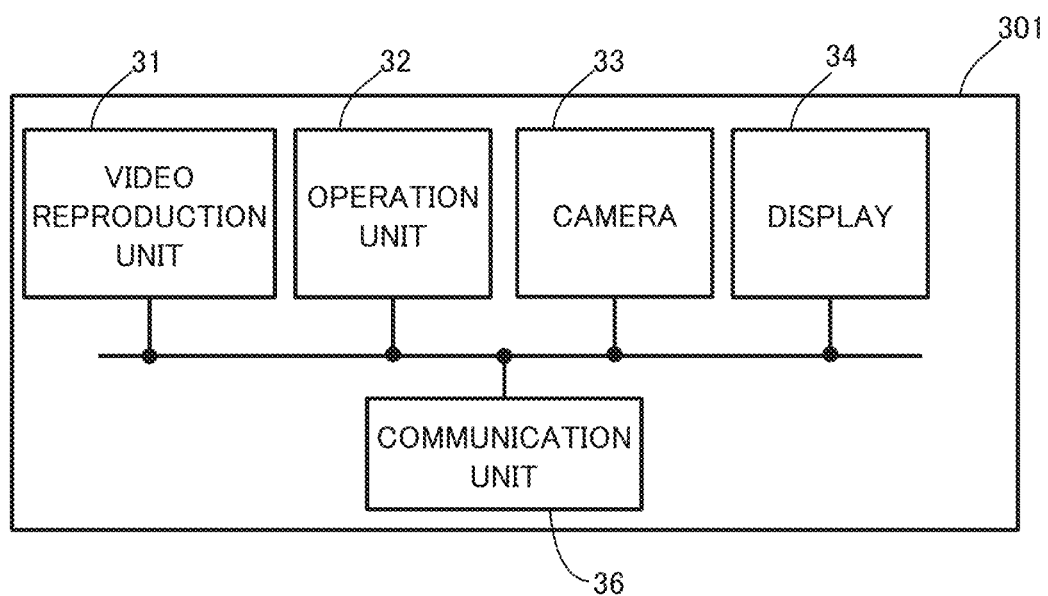
FIG. 5 is a block diagram illustrating a schematic configuration of a user terminal.

FIG. 5 is a block diagram illustrating a schematic configuration of a user terminal 301. As the user terminal 301, an arbitrary terminal can be used as long as it is a terminal that can be connected to the Internet 10 and that can receive and reproduce a distributed learning material. The user terminal 301 is, for example, a personal computer, a tablet, or a smartphone.

The user terminal 301 includes an operation unit 32 and a display 34. The user terminal 301 may further include a speaker (not shown) and a microphone (not shown). These are examples of configurations required to reproduce a learning material. The operation unit 32 is realized by, for example, a touch panel provided integrally with the display 34 or the like, and receives an input from a student.

The user terminal 301 includes a camera 33. The camera 33 is an example of a configuration for obtaining identification information (second identification information) from a user (second user) located at a predetermined position with respect to the user terminal 301. The second identification information is used for user authentication in login processing described later. The second identification information is also used for identity verification during learning.

If the first identification information is obtained by analyzing the photographed image, the user terminal 301 includes an image analysis unit (not shown) in addition to the camera 33, as a configuration for obtaining the second identification information. Alternatively, the image analysis unit may be provided in the distribution device 100.

The user terminal 301 includes a communication unit 36. The communication unit 36 is realized by a communication device such as a communication module and a function of a processor that controls the communication device. The communication unit 36 communicates with user terminals 301 and the educational institution server 201 via the Internet 10. The communication unit 36 controls communication between the distribution device 100 and the educational institution server 201.

The user terminal 301 includes a video reproduction unit 31. The video reproduction unit 31 may be realized by a web browser, or may be a function realized by a processor executing an application for online learning.

[Description of Method for Providing Online Learning]

Figure 6:
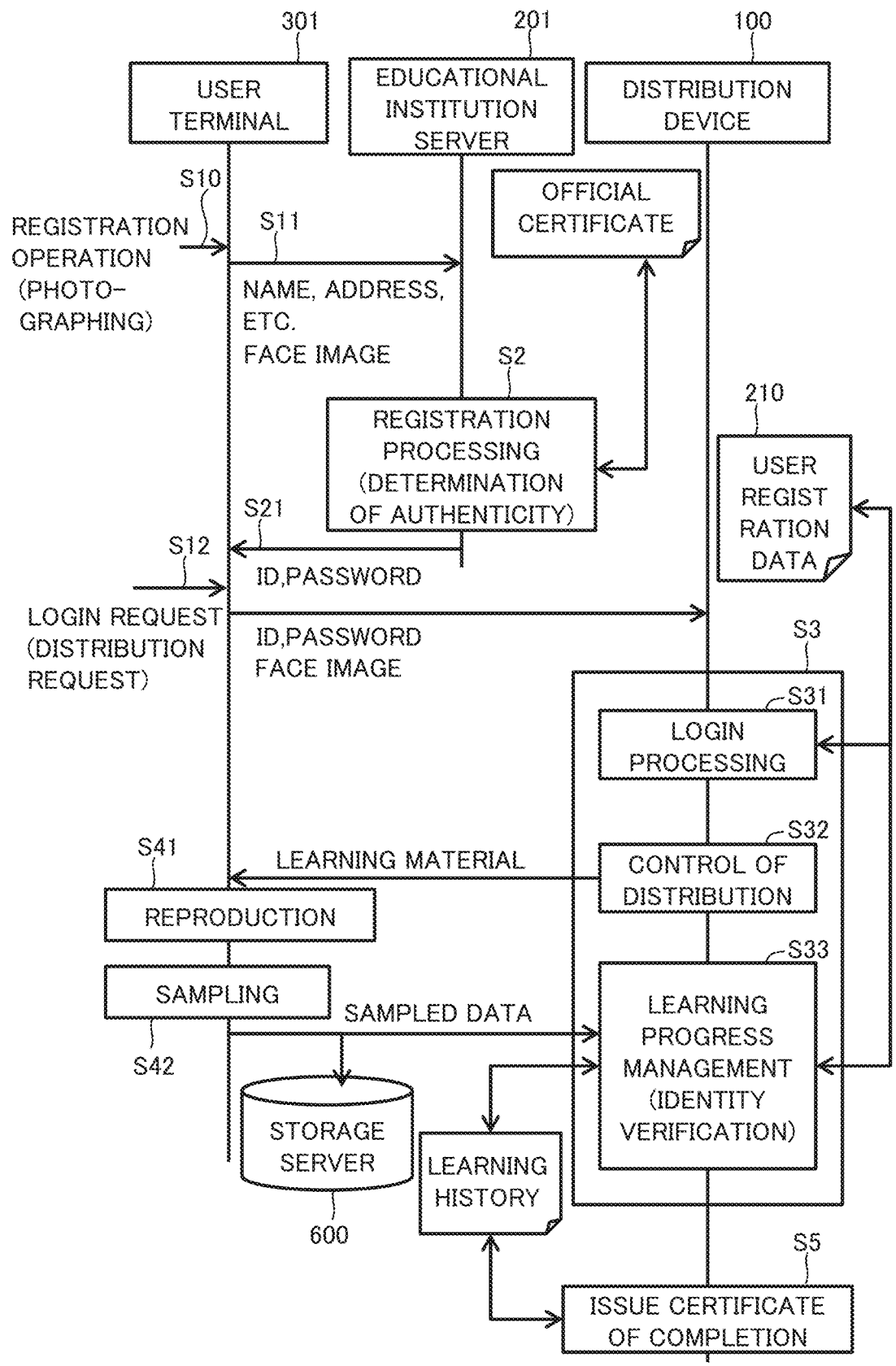
FIG. 6 is a diagram schematically illustrating an example of a flow of a method for providing online learning in the online learning system.

FIG. 6 is a diagram schematically illustrating an example of a flow of a method for providing online learning in the online learning system 100a. In the method for providing online learning, first, the user terminal 301 receives a registration-instructing operation from a user who desires registration (Step S10). In Step S10, the user terminal 301 receives input of, for example, name, address, and the like, and also receives input of a face image by taking a photo for registration.

For example, the user terminal 301 transmits the name, address, and the like input by a user operation to the educational institution server 201 according to the application stored in a memory, and also transmits the face image to the educational institution server 201 (Step S11). When receiving this information from the user terminal 301, the educational institution server 201 executes registration processing (Step S2) and stores this information in the registration data storage unit 21 as user registration data 210.

In the registration processing, the educational institution server 201 issues an ID and password to the user to be registered (Step S21). After having the ID and password issued, the registered user can request the distribution device 100 from the user terminal 301 to distribute a learning material.

The user terminal 301 receives, from the user, an instruction to request distribution of a learning material, transmits the ID and password necessary for login to the distribution device 100, takes a face image necessary for distribution, and transmits the image data to the distribution device 100 (Step S12).

When receiving a distribution request from the user terminal 301, the distribution device 100 executes distribution processing (Step S3). The distribution processing includes login processing (Step S31) that verifies the ID and password from the user terminal 301 with the ID 211 and password 212 of the user registration data 210. Furthermore, the login processing includes face authentication of the image data from the user terminal 301 using the face photo data for authentication 215. Face authentication of the student upon login allows the user (first user) who instructed distribution of a learning material to be confirmed to be a registered user. Therefore, it is possible to prevent unauthorized logins by others, and it is also possible to prevent others from learning by impersonation.

It should be noted that image data of a face image transmitted from the user terminal 301 at the time of the distribution request and for which the login processing was successful may be stored in the storage server 600, which will be described later. Thereby, the image data can be used as second identification information for authentication in the authentication system 700a.

The distribution processing includes control of distribution of a learning material (Step S32). The distribution control includes control for distributing or stopping distribution of a learning material requested by the user terminal 301 according to the operation of the user terminal 301. The user terminal 301 receives the learning material from the distribution device 100 and reproduces the same (Step S41). Thereby, the user can take the learning material using the user terminal 301 as a content reproducing device.

The distribution processing includes learning progress management (Step S33). The learning progress management includes the distribution device 100 updating the student's learning history, by assuming the part from the point at which the distribution to the user terminal 301 started to the point at which the distribution stopped as having been learned.

Preferably, the learning progress management includes identity verification and learning progress confirmation regarding the student (second user) during distribution. The user terminal 301 reproduces the distributed learning material according to the program, and at a predetermined timing (for example, at a fixed time interval, etc.), the user terminal 301 photographs (samples) the second user at a predetermined position with the camera 33 and transmits image data (sampled data) to the distribution device 100 (Step S42).

The distribution device 100 uses the sampled data as the second identification information and matches the same with the face photo data for authentication 215 included in the user registration data 210 to perform identity verification, i.e., to verify whether the second user is a registered user. The distribution device 100 may perform identity verification, for example, every 10 seconds when sampled data are obtained every 10 seconds, or may perform identity verification at intervals longer than 10 seconds using any of the sampled data obtained every 10 seconds. The timing of personal authentication may be random. If these coincide as a result of matching, the identity verification is assumed to be successful; if they do not match, the identity verification is assumed to fail.

If the identity verification is successful, the distribution device 100 updates the learning history of the student, by assuming the part from the start of reproduction of the learning material to the point being reproduced at the sampling time as having been learned by the registered user himself/herself. If identity verification fails, there is a possibility that a user other than the registered user is learning the learning material, which is so-called impersonation, or even if the user is the registered user him/herself, there is a possibility that he/she may be falling asleep or leaving and not attending properly. In such a case, as an example, the distribution device 100 does not update the learning history. The distribution device 100 may stop distributing the learning material when the identity verification fails. Preferably, the distribution device 100 does not update the learning history when the personal authentication fails a predetermined number of times or more within a predetermined period during the reproduction of the learning material, or when the personal authentication fails a predetermined number of times or more consecutively. If the learning material includes an item, when the identity verification fails, the distribution device 100 may assume that the item concerned has not been learned.

Sampled data personal authentication of which have been successful are distributed and stored in a plurality of storage servers 600a, 600b, 600c, . . . which are different from the storage location of the user registration data 210, in association with the ID of the registered user. A storage server typified by the plurality of storage servers 600a, 600b, 600c, . . . is referred to also as the storage server 600. The plurality of storage servers 600a, 600b, 600c, . . . may be, for example, blockchains. Incidentally, a plurality of sets of sampled data may be stored in one storage server 600.

When detecting, from the learning history, that the registered user has completed learning the learning material, the distribution device 100 issues a certificate of completion (Step S5). A certificate of completion is issued when it is detected that a predetermined amount of a content has been reproduced.

Figure 7:
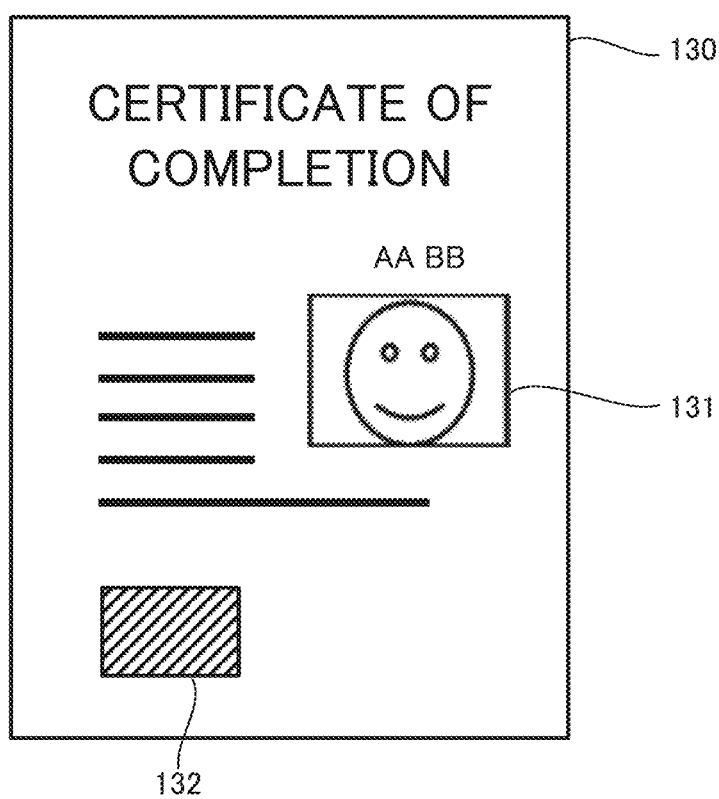
FIG. 7 is a schematic diagram conceptually illustrating an example of a certificate of completion.

FIG. 7 is a schematic diagram conceptually illustrating an example of a certificate of completion. The certificate of completion 130 may be a digital certificate or an analog certificate. The certificate of completion 130 includes a first image 131. The first image 131 includes a face image (first identification information) of a registered user who has completed the learning. The first image 131 is displayed by incorporating the registered user's face photo data for authentication 215 of the user registration data 210 into the format of the certificate of completion (not shown).

The certificate of completion 130 includes a second image 132. The second image 132 is information corresponding to the unique information of the registered user who has completed the learning. The unique information is, for example, the ID 211. The second image 132 may be, for example, a two-dimensional code such as a QR code (registered trademark), a one-dimensional code such as a bar code, or the like. By optically reading the second image 132 with the reading device 900, the ID 211 of the registered user is obtained.

[Description of Authentication Server]

Figure 8:
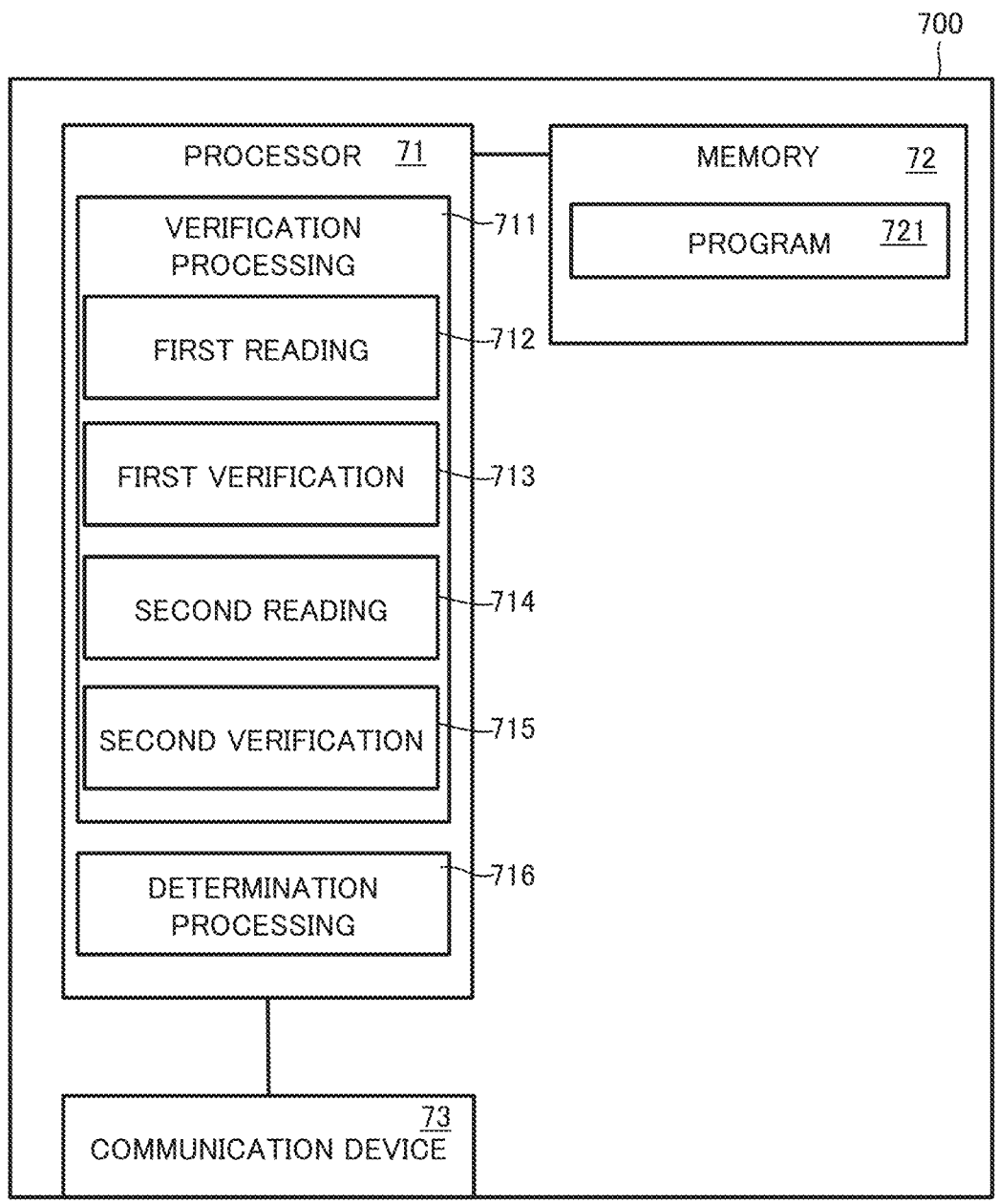
FIG. 8 is a block diagram illustrating a schematic configuration of a processing device.

FIG. 8 is a block diagram illustrating a schematic configuration of the authentication server 700. The authentication server 700 is configured by, for example, a computer including a processor 71 and a memory 72, or one computer and its peripheral devices. The authentication server 700 may be realized by a plurality of computers working together.

The processor 71 is, for example, a CPU. The memory 72 includes, for example, an ROM or an RAM. The memory 72 stores a program 721 to be executed by the processor 71. By executing the program 721, the processor 71 executes respective processing operations described below. The program 721 can be transferred in a state recorded on a computer-readable recording medium, or can be transferred by downloading.

The authentication server 700 includes a communication device 73. Alternatively, the authentication server 700 is connected to the communication device 73. The communication device 73 is a communication module or the like, and sends and receives data to and from other devices via the Internet 10.

The processor 71 executes verification processing 711 by executing the program 721. The verification processing 711 includes performing first reading 112. The first reading 112 refers to accessing the educational institution server 201 and reading out, from the user registration data 210, the face photo data for authentication 215 associated with the ID from the reading device 900. The verification processing 711 includes performing first verification 113. The first verification 113 refers to verifying the face image received from the reading device 900 with the face photo data for authentication 215.

The verification processing 711 preferably includes performing second reading 114. The second reading 114 refers to reading second identification information other than the face photo data for authentication 215 stored in association with the ID from the reading device 900.

The second identification information is preferably sampled data. In this case, the second reading 114 refers to accessing the plurality of storage servers 600 and reading out the plurality of sampled data stored in association with the ID from the reading device 900. Here, the second reading 114 may be performed by randomly reading a plurality of sampled data. The second identification information may be anything other than the face photo data for authentication 215, and is not limited to sampled data. The second identification information is, for example, image data of a face image that is transmitted from the user terminal 301 when distribution is requested, and may be a result of successful user authentication.

The verification processing 711 includes performing second verification 115. The second verification 115 refers to verifying the face image received from the reading device 900 with the second identification information such as sampled data.

The processor 71 executes determination processing 716 by executing the program 721. The determination processing 716 includes determining the authenticity of the certificate of completion based on the verification result. As an example, the determination of authenticity may be such that the certificate of completion is assumed to be "true" when the first verification 113 is successful, and "false" when the first verification 113 is unsuccessful. As another example, the determination of authenticity may be such that the certificate is assumed to be "true" when the first verification 113 is successful and the second verification 715 is successful, and the certificate is assumed to be "false" when the first verification 113 is unsuccessful. As still another example, the determination of authenticity may be such that the certificate is assumed to be "true" when the first verification 113 is successful and the second verification 715 is successful, and the certificate is assumed to be "false" when at least one of the first verification 113 and the second verification 715 is unsuccessful.

The processor 71 passes at least one of the result of the determination processing 716, the result of the first verification 713, and/or the result of the second verification 715 to the communication device 73, and causes the communication device 73 to transmit it to a predetermined destination. The predetermined destination is, for example, the reading device 900A carried by the staff member. This allows the staff member to know the determination result or to determine the authenticity of the certificate of completion.

Preferably, when the determination result is "false" or regardless of the determination result, the processor 71 passes the face photo data for authentication 215 to the communication device 73 and causes the communication device 73 to transmit the same to a predetermined destination. The predetermined destination is as described above. This allows the staff member to visually recognize the face image registered in correspondence to the ID written on the certificate of completion 130. Therefore, the staff member can visually determine whether the user who submitted the certificate of completion is the registered user him/herself.

The predetermined destination may be a reading device 900B exclusive for such use installed at a driver's license center or the like or an educational institution server 201. In this case, these devices may output according to the determination results and verification results. These devices may, for example, sound a buzzer or send a notification to a predetermined destination when the determination result is "false."

[Description of Reading Device]

Figure 9:
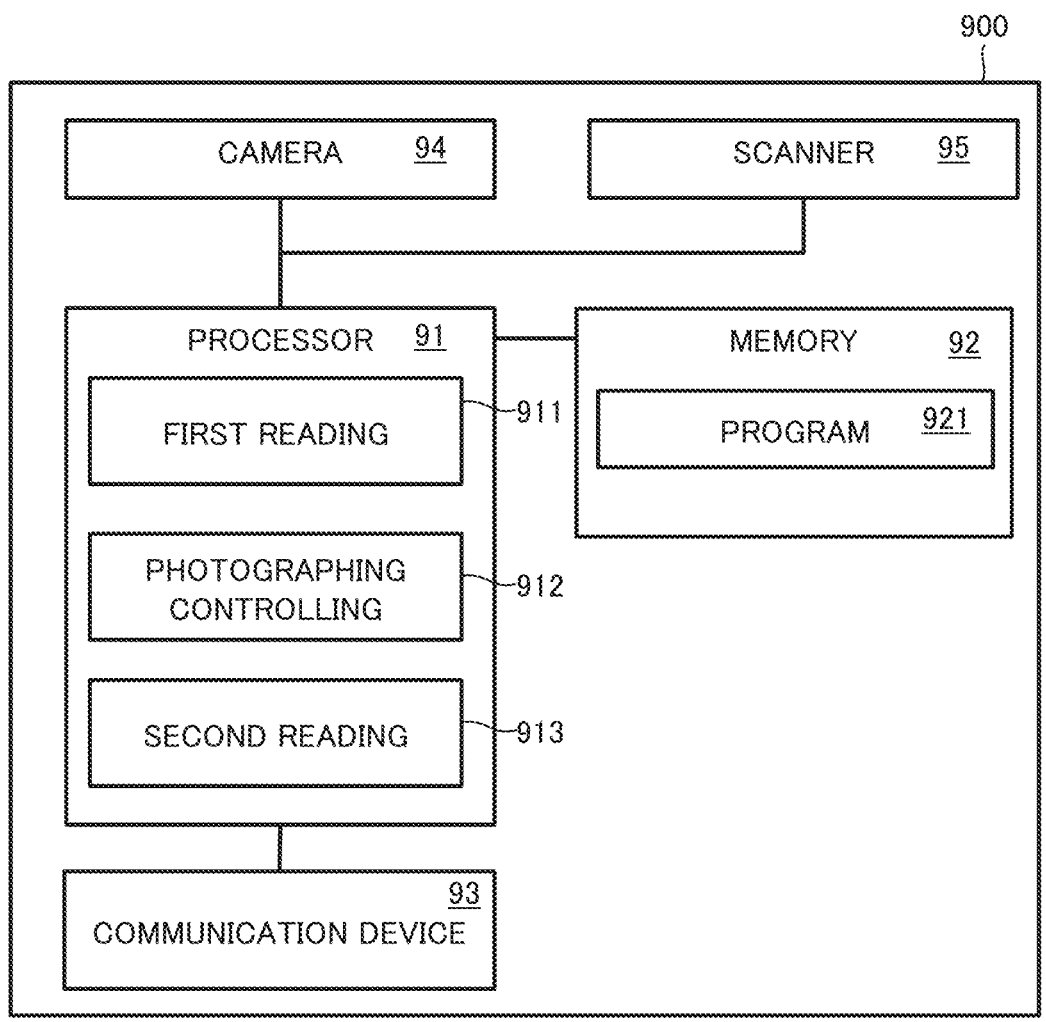
FIG. 9 is a block diagram illustrating a schematic configuration of a reading device.

FIG. 9 is a block diagram illustrating a schematic configuration of the reading device 900. In the case of the first example, the reading device 900 may be any terminal as long as the terminal is a device such as a personal computer, a tablet, or a smartphone that can be connected to the Internet 10 and has a camera as an example of a configuration for reading access information from a certificate of completion. The reading device 900 is configured by, for example, a computer including a processor 91 and a memory 92, or one computer and its peripheral devices. The reading device 900 may be realized by a plurality of computers working together.

The processor 91 is, for example, a CPU. The memory 92 includes, for example, an ROM or an RAM. The memory 92 stores a program 921 to be executed by the processor 91. By executing the program 921, the processor 91 executes respective processing operations described below. The program 921 can be transferred in a state recorded on a computer-readable recording medium, or can be transferred by downloading from a computer device.

The reading device 900 includes a communication device 93. In addition, the reading device 900 includes a camera 94. Alternatively, the reading device 900 is connected to the camera 94. The camera 94 performs a photographing operation under the control of the processor 91 and inputs image data to the processor 91.

The processor 91 executes first reading 911 by executing the program 921. The first reading 911 refers to reading the ID from the image data of the second image 132 of the certificate of completion 130 input from the camera 94. As a technique for reading an ID from image data, any known technique may be used. Incidentally, the first reading 911 may be executed not according to the program 921 but according to another program installed in the reading device 900 in advance.

The processor 91 executes photographing controlling 912 by executing the program 921. The photographing controlling 912 includes receiving a user operation that instructs photographing and thereby causing the camera 94 to perform photographing.

The processor 91 executes second reading 913 by executing the program 921. The second reading 913 includes reading the first image 131 from the image data of the certificate of completion 130 that was photographed and input, and reading the face image from the first image 131. As a technique for reading a face image from image data, any known technique may be used.

The processor 91 passes the face image read from the certificate of completion 130 (hereinafter referred to as a read face image) to the communication device 93, and causes the communication device 93 to transmit it to the destination prescribed by the program 921, i.e., the authentication server 700. As a result, verification processing 711 is requested to the authentication server 700.

In the case of the second example, the reading device 900 further includes a scanner 95. The scanner 95 is, for example, a code reader. The scanner 95 scans the second image 132 of the certificate of completion 130 placed within a reading range and inputs scan signals to the processor 91. The processor 91 performs the first reading 911 to read the ID from the scan signals, and activates the camera 94 according to the program 921 if the ID is read from the second image 132. This puts the camera 94 in a state where it can photograph. The processor 91 performs photographing controlling 912 to cause the camera 94 to photograph a first image 131 of the certificate of completion 130 placed within a photographing range.

In the case of the second example, the reading device 900 may further include an operation unit (not shown) such as a touch panel, and may receive input of login information such as the ID of the user who submits the certificate of completion 130. In this case, the authentication server 700 may access the user registration data 210 of the educational institution server 201 and perform the login processing using the login information received from the reading device 900.

[Description of Method for Verifying Certificate of Completion]

Figure 10:
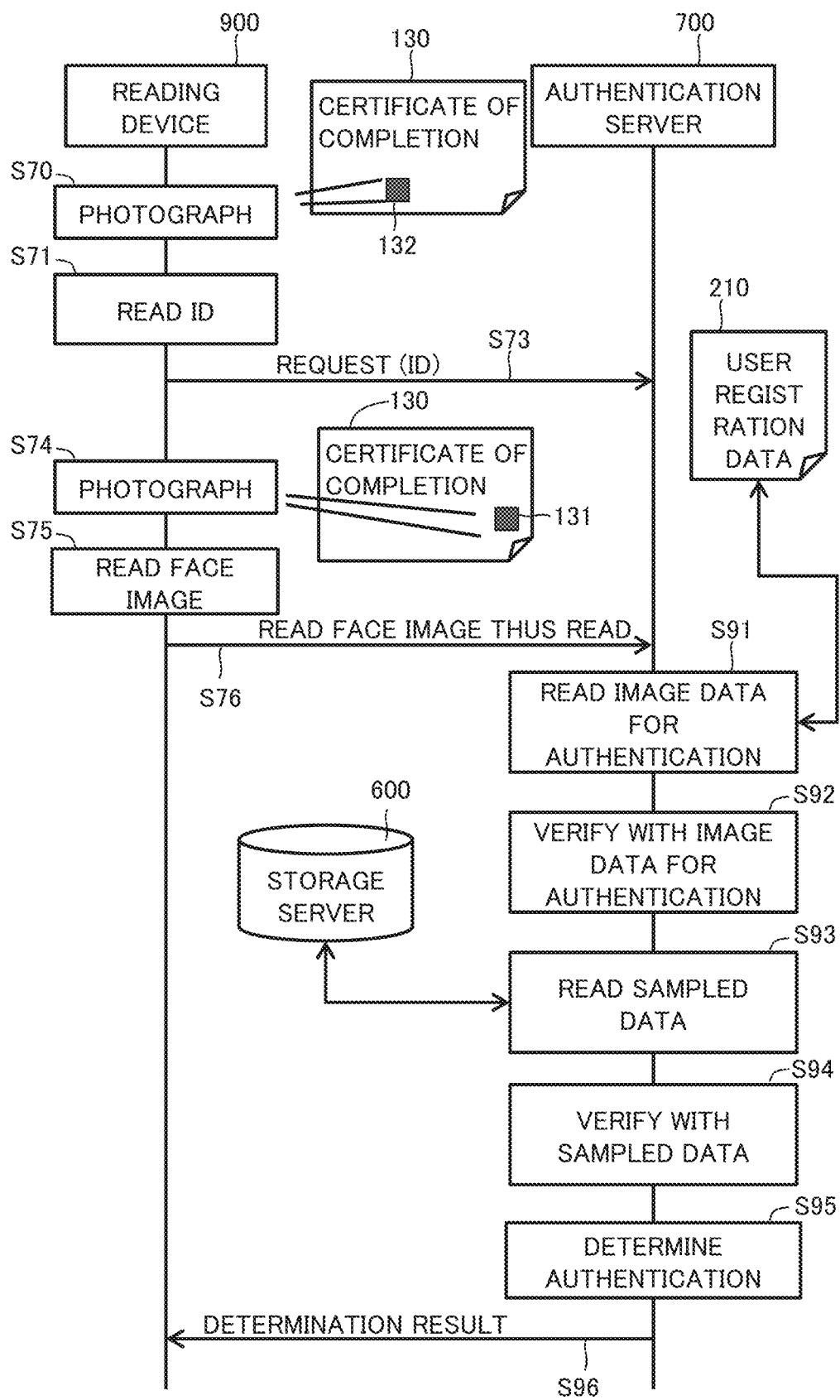
FIG. 10 is a diagram schematically illustrating an example of a flow of a method for verifying a certificate of completion in the verification system.

FIG. 10 is a diagram schematically illustrating an example of a flow of a method for verifying a certificate of completion in the authentication system 700a. In the method for verifying the certificate of completion, first, the reading device 900 reads the certificate of completion 130.

In the case of the first example, the staff member photographs a second image 132 of the certificate of completion 130 using the reading device 900A that he or she carries (Step S70). The reading device 900A reads the ID from the second image 132 included in the photographed images (Step S71), and requests verification by transmitting the read ID to the authentication server 700 prescribed by the program 921 (Step S73).

When the ID is read from the second image 132, the reading device 900A may be in a state where it can photograph the first image 131. For example, in accordance with the program 921, the reading device 900A may display a message such as "Please photograph the first image 131", or may display a frame in which the first image 131 is to be placed.

The staff member further photographs a first image 131 of the certificate of completion 130 using the reading device 900A (Step S74). The reading device 900A reads a face image from the first image 131 included in the photographed images (Step S75), and transmits the read face image to the authentication server 700 prescribed by the program 921 (Step S76).

In the case of the second example, the user who submits the certificate of completion 130 inserts the certificate of completion 130 into the installed reading device 900B and, for example, presses an authentication start button, whereby the second image 132 is scanned by the scanner 95 (step S70). The reading device 900 reads the ID from the scan signals (Step S71). When the ID is read from the scan signals, the reading device 900B activates the camera 94 according to the program 921 and photographs the first image 131 of the certificate of completion 130 (Step S74). The reading device 900 reads the face image from the first image 131 included in the photographed images (Step S75), and transmits the same together with the ID read in Step S71 to the authentication server 700 prescribed by the program 921 to request verification (Step S73).

Next, the authentication server 700 verifies the read face image.

That is, the authentication server 700 accesses the educational institution server 201, reads, out of the user registration data 210, the face photo data for authentication 215 associated with the ID from the reading device 900 (Step S91), and verifies the read face image (Step S92).

Additionally, the authentication server 700 randomly accesses the plurality of storage servers 600, reads out one or more pieces of sampled data stored in association with the ID from the reading device 900 (Step S93), and verifies the read face image. (Step S94).

The authentication server 700 determines the authenticity of the certificate of completion 130 based on these verification results (Step S95), and outputs the result to a predetermined device (Step S96). The predetermined device is, for example, the reading device 900. Further, in Step S96, the authentication server 700 may transmit the verification results or may transmit the face photo data for authentication 215.

[Description of Processing in Authentication Server]

Figure 11:
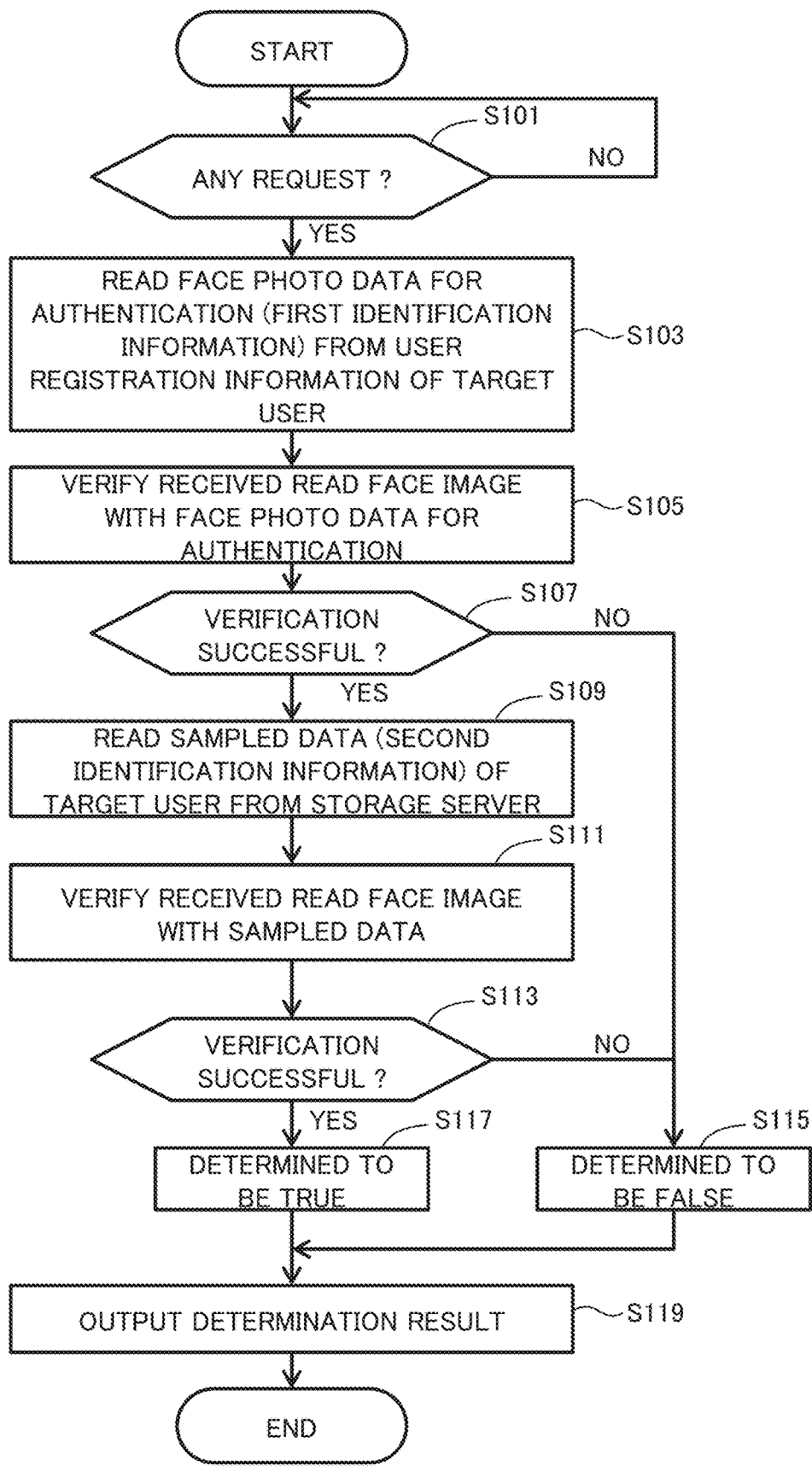
FIG. 11 is a flowchart illustrating an outline of a flow of processing in the processing device.

FIG. 11 is a flowchart illustrating an outline of the flow of processing in the authentication server 700. The authentication server 700 is waiting for a verification request from the reading device 900, and upon receiving the request (YES at Step S101), starts the subsequent processing.

Upon receiving the request, the authentication server 700 accesses the educational institution server 201 and reads, out of the user registration data 210, the face photo data for authentication (first identification information) 215 associated with the ID from the reading device 900 (Step S103). The authentication server 700 verifies the read face image, read from the reading device 900, with the face photo data for authentication 215 read out in Step S103 (Step S103). If the verification fails (NO in Step S107), the authentication server 700 determines that it is "false" (Step S115) and outputs the result (Step S119).

If the verification is successful (YES in Step S107), the authentication server 700 accesses the storage servers 600, reads out sampled data stored in association with the ID from the reading device 900 (Step S109), and further verifies the read face image (Step S111).

Here, the authentication server 700 may randomly access multiple storage servers 600a, 600b, 600c, . . . and read out one or more sets of sampled data and use the same for verification, or may randomly read out one or more sets of sampled data from among the sampled data stored in one storage server 600 and use the same for verification. Furthermore, as another example, the authentication server 700 may read, from the storage server 600, face image data obtained from the user terminal 301 used for login processing at the start of distribution, in place of or in addition to the sampled data, and may use the same for verification.

If the verification fails (NO in Step S113), the authentication server 700 determines that it is "false" (Step S115) and outputs the result (Step S119). If the verification is successful (YES in Step S113), the authentication server 700 determines that it is "true" (Step S117) and outputs the result (Step S119).

If the verification (first verification) in step S105 fails, there is a high possibility that the first image 131 of the certificate of completion 130 is different from the face photo data for authentication 215. This provides an assumption that after a registered user (User A) completes the learning and receives a certificate of completion, the first image 131 of the certificate of completion 130 is replaced with a face image of another user (User B) (forgery), and User B pretends to be User A (#2B in FIG. 1). Such impersonation can be easily detected by performing the first verification in the authentication system 700a and determining whether the certificate of completion 130 is forged.

If the verification in Step S111 (second verification) fails, there is a high possibility that the first image 131 of the certificate of completion 130 coincide with the face photo data for authentication 215, but is different from the face image (sampled data) obtained during reproduction. This provides an assumption that the first image 131 of the certificate of completion 130 is replaced with the face image of User B (forgery), and the face photo data for authentication 215 of User A stored in the memory of the educational institution server 201 are also altered into the face image of User B, whereby User B pretends to be a registered user (#2B in FIG. 1).

Even if the face photo data for authentication 215 of the educational institution server 201 are altered, it is unlikely that the sampled data stored in a memory other than the educational institution server 201 will also be altered. Furthermore, when a plurality of pieces of sampled data are distributed and stored in a plurality of storage servers 600a, 600b, 600c, . . . , it is unlikely that all the sampled data will be altered. In this case, therefore, the risk of alteration is suppressed. Therefore, even if such alteration of the educational institution server 201 occurs and the first verification is successful, the second verification will be performed and it will be determined that the certificate of completion 130 is forged, which makes it possible to detect impersonation.

As another example, the authentication server 700 may perform the second verification (Step S111) regardless of the success or failure of the first verification (Step S105). Furthermore, the second verification may be performed multiple times using at least two or more pieces of sampled data. In this case, the authentication server 700 may determine that it is "true" when at least one time of the first and second verifications is successful. By performing two-step verification in this way, it is possible to determine authenticity even in the presence of noise. Alternatively, the authentication server 700 may determine that it is "true" only when all of the first and second verifications are successful. As described above, the authentication server 700 performs multi-step verification, thereby making it possible to further improve security.

Also, in this example, the second image 132 includes the ID. Therefore, if the second image 132 is forged, the ID will not be read out, or the ID will be different from the ID of the registered user, and verification of the registered user will not be requested. Alternatively, a face image of a different registered user may be used for verification, causing the verification to fail. Therefore, forgery of the certificate of completion 130 can be easily detected.

OTHER EXAMPLES

In the above examples, it is supposed that the first image 131 of the certificate of completion 130 is photographed by the reading device 900, but instead of or in addition to the first image 131, the face of the user who submits the certificate of completion 130 may be photographed. In this case, the face image data obtained through photography are handled in the same way as the face image data read from the first image 131, so that the certificate of completion 130 can be authenticated in the same manner as in the above example.

In the above examples, a verification system for certificates of completion of distributed learning materials is shown, but the matter certified by a certificate are not limited to the completion of learning. For example, the above verification system can be used to determine the authenticity of various certificates, such as certificates for completing watching of entertainment content, or certificates for completing games, quizzes, etc.

The present disclosure is not limited to the above embodiments, and various modifications are possible. Further, the verification system, verification method, and computer-readable recording medium on which the computer program is recorded, according to the embodiment, can also be expressed as follows.

(1) A verification system according to an embodiment has the following configuration. The verification system is a verification system for verifying a certificate of completion of a distributed learning material, and includes a reading device and a processing device. First identification information that is used for user authentication to authenticate that a first user who instructed distribution of a learning material is a registered user is stored in a first server in association with unique information of the registered user. The certificate of completion includes first information that corresponds to the first identification information and second information that corresponds to the unique information. The reading device is configured to read the first information and the second information from the certificate of completion. The processing device is configured to verify the identification information obtained from the read first information, with the first identification information stored in the first server in association with the unique information obtained from the read second information. In the verification system having this configuration, the authenticity of a certificate of completion of a distributed learning material can be determined regarding whether the certificate of completion is a certificate of completion that certifies that the distribution of the distributed learning material was instructed by a registered user.

(2) In the verification system according to (1), preferably the learning material is distributed when the user authentication is successful. This allows the certificate of completion to at least certify that the distribution to the user is accepted.

(3) The verification system according to (1) or (2) preferably has the following configuration: second identification information of the registered user is stored in a second server different from the first server, in association with the unique information of the registered user; and the processing device is configured to further verify the identification information obtained from the read first information, with the second identification information stored in the second server in association with the unique information obtained from the read second information. This makes it possible to improve the accuracy in determining authenticity of certificates.

(4) The verification system according to (1) or (2) preferably has the following configuration: second identification information, which is obtained during distribution of a learning material from a second user during learning, and is used for authenticating that the second user is a registered user with use of first identification information, is stored in association with the unique information of the registered user; and the processing device is configured to further verify the identification information obtained from the read first information, with the second identification information. This allows the certificate of completion to certify that the registered user has learned the learning material.

(5) In the verification system according to (4), preferably, a plurality of pieces of second identification information are obtained from the second user during learning of the learning material, and the plurality of pieces of second identification information are distributed and stored on at least two or more servers. Verification with the second identification information includes verifying the identification information obtained from the read first information with each of the plurality of pieces of second identification information stored in the two or more servers. By distributing and storing a plurality of pieces of second identification information in two or more servers, it is possible to reduce the possibility that the second identification information will be altered.

(6) The verification system according to (3) or (4) preferably has the following configuration: when the verification with the first identification information is successful, the processing device is configured to further perform the verification with the second identification information. By performing multiple-step verification, it is possible to improve the accuracy in determining authenticity of certificates of completion.

(7) In the verification system according to any one of (1) to (6), preferably, the first identification information includes a photographed image obtained by photographing at least a part of the user. The reading device includes a photographing device, and reading the first information includes photographing the first information of the certificate of completion with the photographing device. This makes it possible to easily read the first information.

(8) In the verification system according to (7), preferably the second information is represented by code information. This makes it possible to allow necessary information to be easily included in the certificate of completion.

(9) The verification method according to the embodiment is a method for verifying a certificate of completion of a distributed learning material in a verification system including a processing device and a reading device. First identification information that is used for user authentication to authenticate that a first user who instructed distribution of a learning material is a registered user is stored in a first server in association with unique information of the registered user. The certificate of completion includes first information that corresponds to the first identification information and second information that corresponds to the unique information. The verification method includes: reading the first information and the second information from the certificate of completion by the reading device; passing the information obtained by reading from the reading device to the processing device; and verifying the identification information obtained from the read first information, with the first identification information stored in the first server in association with the unique information obtained from the read second information by the processing device. This method makes it possible to determine the authenticity of a certificate of completion of a distributed learning material regarding whether the certificate of completion is a certificate of completion that certifies that the distribution of the distributed learning material was instructed by a registered user.

(10) The computer-readable recording medium according to the embodiment stores the computer program causing a computer to execute processing for verifying a certificate of completion of a distributed learning material. First identification information that is used for user authentication to authenticate that a first user who instructed distribution of a learning material is a registered user is stored in a first server in association with unique information of the registered user. The certificate of completion includes first information that corresponds to the first identification information and second information that corresponds to the unique information. The computer program causes the computer to execute: reading first information and second information from the certificate of completion; obtaining identification information from the read first information; obtaining unique information from the read second information; and passing the identification information and the unique information to the processing device. This program makes it possible to determine the authenticity of a certificate of completion of a distributed learning material regarding whether the certificate of completion is a certificate of completion that certifies that the distribution of the distributed learning material was instructed by a registered user.

What is claimed is:

1. A verification system for verifying a certificate of completion of a distributed learning material, the verification system comprising:
a reading device; and
a processing device,
wherein first identification information, that is used for user authentication to authenticate that a first user who instructed distribution of the learning material is a registered user, is stored in a first server in association with unique information of the registered user,
the certificate of completion includes first information that corresponds to the first identification information and second information that corresponds to the unique information,
the reading device being configured to read the first information and the second information from the certificate of completion, and
the processing device being configured to verify identification information obtained from the read first information, with the first identification information stored in the first server in association with the unique information obtained from the read second information.

2. The verification system according to claim 1, wherein the learning material is distributed when the user authentication is successful.

3. The verification system according to claim 1, wherein second identification information of the registered user is stored in a second server different from the first server, in association with the unique information of the registered user, and
the processing device is configured to further verify the identification information obtained from the read first information, with the second identification information stored in the second server in association with the unique information obtained from the read second information.

4. The verification system according to claim 3, wherein, when the verification with the first identification information is successful, the processing device is configured to further perform the verification with the second identification information.

5. The verification system according to claim 1, wherein second identification information, which is obtained during distribution of the learning material from a second user during learning, and is used for authenticating that the second user is the registered user with use of first identification information, is stored in association with the unique information of the registered user, and
the processing device is configured to further verify the identification information obtained from the read first information, with the second identification information.

6. The verification system according to claim 5, wherein a plurality of pieces of the second identification information are obtained from the second user during learning of the learning material,
the plurality of pieces of the second identification information are distributed and stored on at least two or more servers, and
verification with the second identification information includes verifying the identification information obtained from the read first information with each of the plurality of pieces of second identification information stored in the two or more servers.

7. The verification system according to claim 1, wherein the first identification information includes a photographed image obtained by photographing at least a part of the user,
the reading device includes a photographing device, and
reading the first information includes photographing the first information of the certificate of completion with the photographing device.

8. The verification system according to claim 7, wherein the second information is represented by code information.

9. A method for verifying a certificate of completion of a distributed learning material in a verification system including a processing device and a reading device,
wherein first identification information, that is used for user authentication to authenticate that a first user who instructed distribution of the learning material is a registered user, is stored in a first server in association with unique information of the registered user,
the certificate of completion includes first information that corresponds to the first identification information and second information that corresponds to the unique information,
the verification method comprising:
reading the first information and the second information from the certificate of completion by the reading device;
passing the information obtained by reading from the reading device to the processing device; and
verifying the identification information obtained from the read first information, with the first identification information stored in the first server in association with unique information obtained from the read second information by the processing device.

10. A computer-readable recording medium stores a computer program causing a computer to execute processing for verifying a certificate of completion of a distributed learning material is recorded,
wherein first identification information, that is used for user authentication to authenticate that a first user who instructed distribution of the learning material is a registered user, is stored in a first server in association with unique information of the registered user,
the certificate of completion includes first information that corresponds to the first identification information and second information that corresponds to the unique information, and
the computer program causes the computer to execute:
reading the first information and the second information from the certificate of completion;
obtaining identification information from the read first information;
obtaining unique information from the read second information; and
passing the identification information and the unique information to a processing device.

* * * * *